US005870847A

United States Patent [19]
Hsiao

[11] Patent Number: 5,870,847
[45] Date of Patent: Feb. 16, 1999

[54] MOLE REPELLER

[76] Inventor: Angelique Hsiao, No. 29-3, Alley 65 Lane 220 Sec. 2, Hsing Lung Rd., Taipei, Taiwan

[21] Appl. No.: 827,196

[22] Filed: Mar. 27, 1997

[51] Int. Cl.⁶ .................................................. A01M 17/00
[52] U.S. Cl. ........................ 43/124; 116/22 A; 367/139; 340/384.7
[58] Field of Search ............................ 43/124; 116/22 A; 361/232; 362/102, 202, 203, 204, 208; 367/139; 340/384.2, 384.7

[56] References Cited

U.S. PATENT DOCUMENTS

| 3,093,761 | 6/1963 | Case ........................................... 43/124 |
| 4,092,695 | 5/1978 | Henderson et al. ..................... 361/232 |
| 4,215,429 | 7/1980 | Riach .................................... 116/22 A |
| 4,366,562 | 12/1982 | McGinty ................................... 43/124 |
| 5,205,066 | 4/1993 | Jan ............................................. 43/124 |
| 5,224,438 | 7/1993 | Buss ...................................... 116/22 A |

FOREIGN PATENT DOCUMENTS 150339  8/1985  European Pat. Off. ................. 43/124

Primary Examiner—Michael J. Carone
Assistant Examiner—Darren Ark
Attorney, Agent, or Firm—Abelman, Frayne & Frayne

[57] ABSTRACT

A repeller includes a tube receiving a covering device connected to a frame via a connector. A handle is pivotally connected to a top of the covering device. The frame contains a repelling device and batteries. The connector is configured to have a hole defined in a surface thereof, a shoulder formed in parallel with the surface and an extension vertically extended downward from the shoulder, such that the connector is able to be connected with the covering device through the hole and mounted to the frame via the extension. Accordingly, a user is able to raise the batteries upward by just simply lifting the handle.

3 Claims, 7 Drawing Sheets

MOLE REPELLER

FIELD OF THE INVENTION

The present invention generally relates to a mole repeller, and more particularly to a mole repeller which is convenient for users to replace batteries received therein.

BACKGROUND OF THE INVENTION

Because moles cause considerable damage to lawns, golf courses and crops, they are regarded as vermin by gardeners and farmers who try to exterminate them. A repeller using the acute hearing and highly developed sense of touch at the ends of the moles' noses and tails has been introduced, which is able to sound a buzz or generate a vibration periodically, which, when detected by the moles, will scare off them without doing any harm. Furthermore, the repeller uses no chemicals or sprays, so that there is no affect to the soil or the environment. Nevertheless, the repeller suffers a disadvantage which is that once the repeller starts, it will not stop making sound or vibration until the electricity of the batteries received therein is used up and thus replacement of the batteries is required.

A conventional repeller is shown in FIGS. 7 and 8. The repeller includes a cap 51, a tube 59 provided with a closed end 591 and an open end 592, a frame 55 having defined therein a plurality of battery compartments (not numbered) for receiving batteries therein and a configuration adapted to be slidably received within the tube 59, a buzzing/vibrating device 57 securely mounted onto the frame 55 and a sealing pad 53 having a diameter adapted to a diameter of the tube 59. In assembly, the buzzing/vibrating device 57 together with the frame 55 having a plurality of batteries disposed within the compartments thereof are inserted into the tube 59. Then, the sealing pad 53 is inserted into the tube 59 to seal the tube 59. After the tube 59 is sealed by the sealing pad 53, the cap 51 is threadingly engaged with a periphery of the open end 592 of the tube 59. The assembled repeller is shown in FIG. 8.

The repeller is designed to be pushed into the soil, as shown in the schematic view of FIG. 8, preferably totally covered by the soil at a depth of about 15 cm. This ensures close acoustic contact with the soil and results in transmission of the sound/vibration over a great distance. Yet, as previously mentioned, since the repeller has no on/off switch mounted thereon, the repeller will periodically sound a buzz or vibrate once the assembly is accomplished. After the electricity of the batteries received within the compartments of the frame 55 is exhausted, the users will have to dig out the repeller, clean the pipe, open the cap 51 and try to reach the frame 55 to pull it out of the tube 59 in order to replace the batteries. Due to the consideration of portability, the diameter of the tube 59 of the repeller is small, which results in that the users will have trouble reaching the frame, let alone replacing the batteries.

From the previous description, the repellers currently available requiring users to reach the frame with their fingers in order to replace the batteries will not fulfill the needs of users and improvements and/or alternations thereof are thus required. A repeller having designed to enable users thereof to conveniently replace batteries received within the compartments of the frame and constructed in accordance with the present invention tends to mitigate and/or obviate the aforementioned problems.

SUMMARY OF THE INVENTION

The main objective of the invention is to provide a repeller having a covering device which comprises an upper plate, a middle plate and a lower plate disposed therebetween. The upper plate and the lower plate are preferably made of metal and the middle plate is preferably made of rubber, such that when the upper plate and the lower plate are moved closer to each other by tightening a screw and a nut, the middle plate will expand outwardly, which will seal an open end of the repeller. Alternately, the upper plate may also be made of plastic to accomplish the same purpose.

Another objective of the invention is to provide a repeller enabling the users to conveniently replace the batteries received within compartments of a frame. Accordingly, the repeller includes a tube having a closed end and an open end, a frame having an attachment securely mounted on a first end thereof, a plurality of compartments defined therein and a buzzing/vibrating member securely mounted at a second end thereof, a covering device configured to sealingly cover the open end of the tube and a connector secured between the covering device and the attachment of the frame. Therefore, a user can easily have access to the compartment of the frame to replace the exhausted batteries, due to the secure engagement between the connector and the attachment.

Still another objective of the invention is to provide a repeller having a handle pivotally connected to the covering device, thereby allowing a user to pull out the covering device easily and avoiding accidental damage to blades of a lawn mower and the like.

Other objects, advantages and novel features of the invention will become more apparent from the following detailed description when taken in conjunction with the accompanying drawings.

BRIEF DESCRIPTION OF THE DRAWINGS

The present invention will now be better understood with reference to the accompanying drawings wherein.

DETAILED DESCRIPTION OF THE PREFERRED EMBODIMENT

Figure 1:
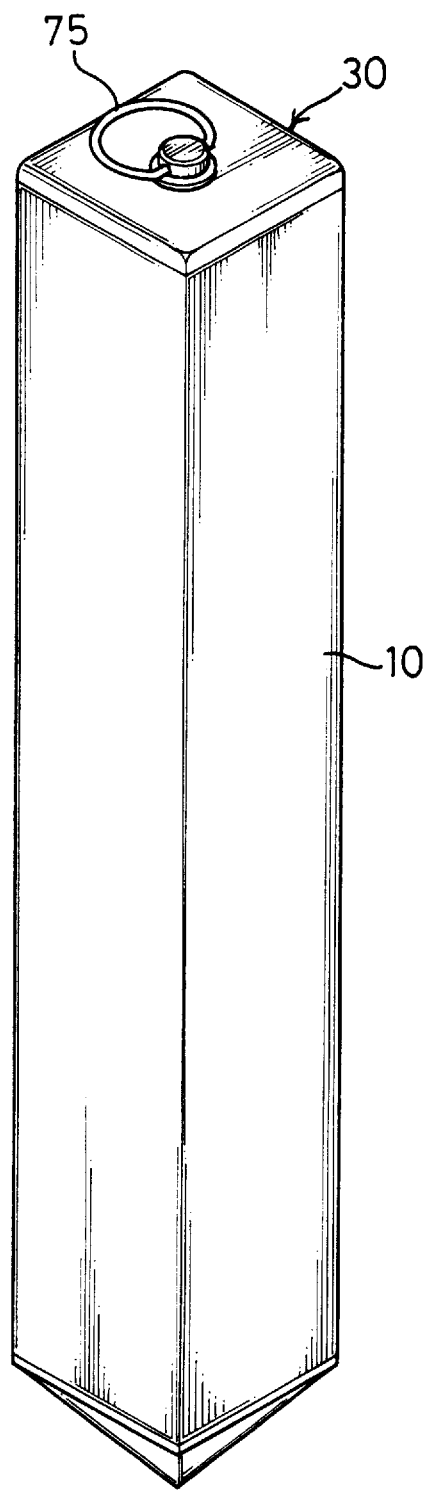
FIG. 1 is a perspective view showing a repeller configured in accordance with the present invention.
Figure 2:
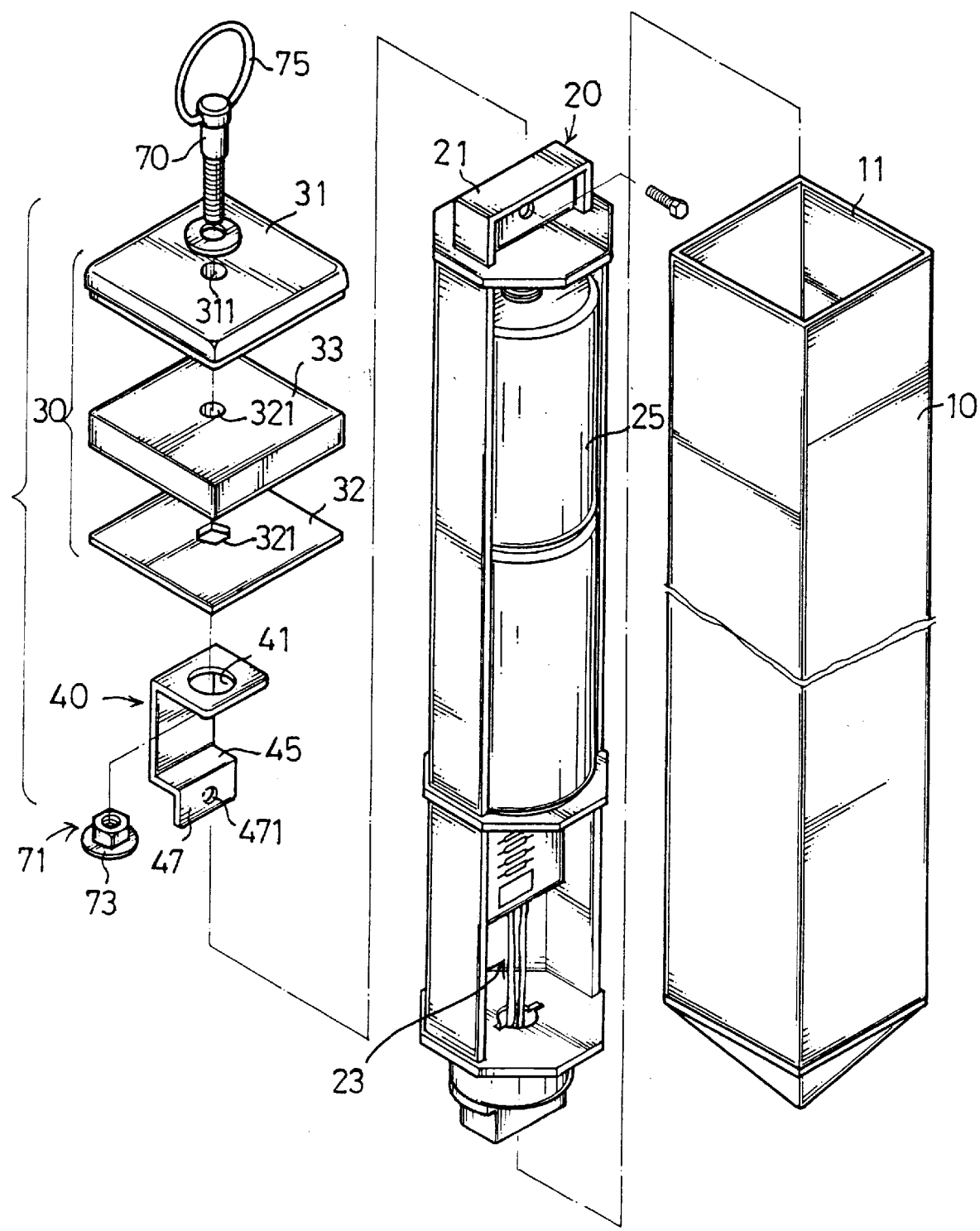
FIG. 2 is an exploded view of the repeller as shown in FIG. 1.

Referring to FIGS. 1 and 2, one preferred embodiment of the invention is shown. The repeller of the invention comprises a tube 10 having a closed end (not labeled) and an open end 11, a frame 20 having a plurality of battery compartments (not shown) defined therein, an attachment 21 secured to a first end thereof and a buzzing/vibrating device 23 mounted to a second end thereof, a covering device 30 configured to fit into the open end 11 of the tube 10 and a connector 40 securely connected between the covering device 30 and the attachment 21 via a screw 70 and a nut 71 having a flange 73 integrally extended radially. It is to be noted that the covering device 30 further comprises an upper plate 31, a lower plate 32 and a middle plate 33 disposed therebetween. The middle plate 33 is made of a resilient, water proof material. The upper plate 31, the lower plate 32 and the middle plate 33 respectively have a centrally defined through hole 311, 321, 331 defined therein so that the screw 70 is able to be inserted therethrough. The through hole 321 of the lower plate 32 is configured to receive the nut 71. The through hole 321 of the lower plate 32 has a diameter slightly larger than a diameter of the nut 71 but smaller than a diameter of the flange 73, such that when the nut 71 is inserted into the through hole 321 of the lower plate 32, the nut 71 is able to be positioned therein. The connector 40 has a hole 41 aligned with the through hole 321 of the lower plate 32, a shoulder 45 formed parallel to a surface of the hole 41 and a downward extended extension 47 vertically extended from the shoulder 45 and having a side hole 471 defined therein. The middle plate 33, preferably made of a resilient material, such as rubber, will be expanded outwardly when the upper plate 31 and the lower plate 32 are moved closer to each other via tightening/the screw 70 and the nut 71. Therefore, when the covering device 30 is inserted into the open end 11 of the tube 10 and when the screw 70 is screwed in, an expansion of the middle plate 33 will automatically seal the open end 11 of the tube 10 and thus forms a perfect cover to the tube 10. In assembly, firstly, the covering device 30 and the connector 40 are combined together through the insertion of the screw 70 into the respective through holes 311, 331, 321 of the upper plate 31, the middle plate 33, the lower plate 32 and the hole 41 of the connector 40 and threadingly connecting with the nut 71 securely disposed under the surface having the hole 41 of the connector 40. Then, the extension 47 is mounted to the attachment 21 of the frame 20 via the side hole 471 of the extension 47. The frame 20 together with the covering device 30 is inserted into the tube 10 from the open end 11 thereof. By further tightening of the screw 70 with the nut 71, the middle plate 33 will be compressed between the lower plate 32 and the upper plate 31; so that an outward expansion of the middle plate 33 will have a contact with an inner periphery of the tube 10, thereby sealing the tube 10 and protecting the contents thereof from moisture, etc.

Figure 3:
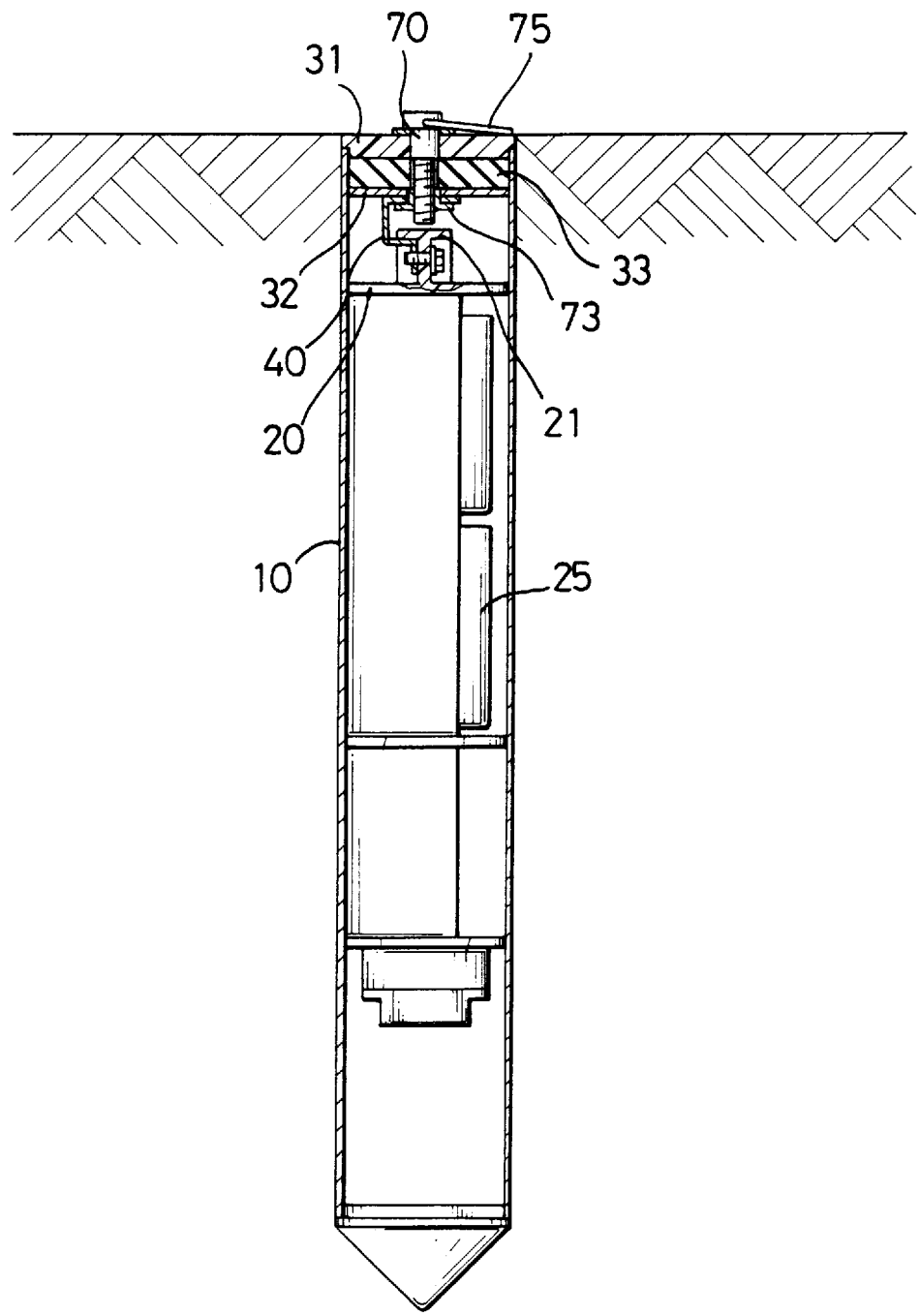
FIG. 3 is a schematic and partial cross sectional view showing the repeller of the invention pushed into the soil.

Referring to FIG. 3, it is noted that the repeller is preferably pushed into the soil and the very top end face of the covering device 30 of the repeller should be flush with the top of the soil, so that people will not trip against it or does damage to the blades of the lawnmower.

Figure 4:
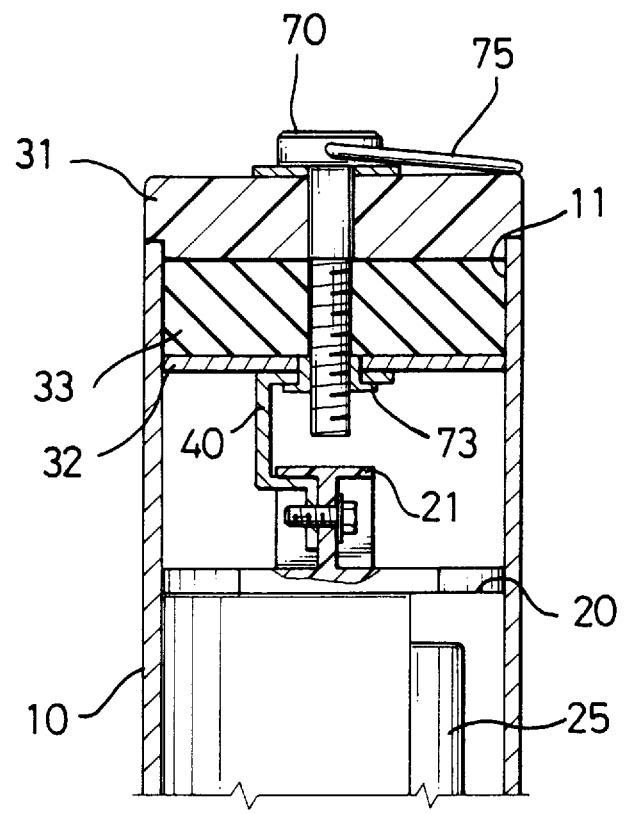
FIG. 4 is a partial cross sectional view showing the relationship between a covering device and an attachment of a frame in enlarged scale.

FIG. 4 shows that when the screw 70 is further screwed into the nut 71, the flange 73 of the nut 71 abuts to a bottom face of the connector 40, which causes the middle plate 33 to expand in all directions and thus the open end 11 of the tube 10 is sealed.

Figure 5:
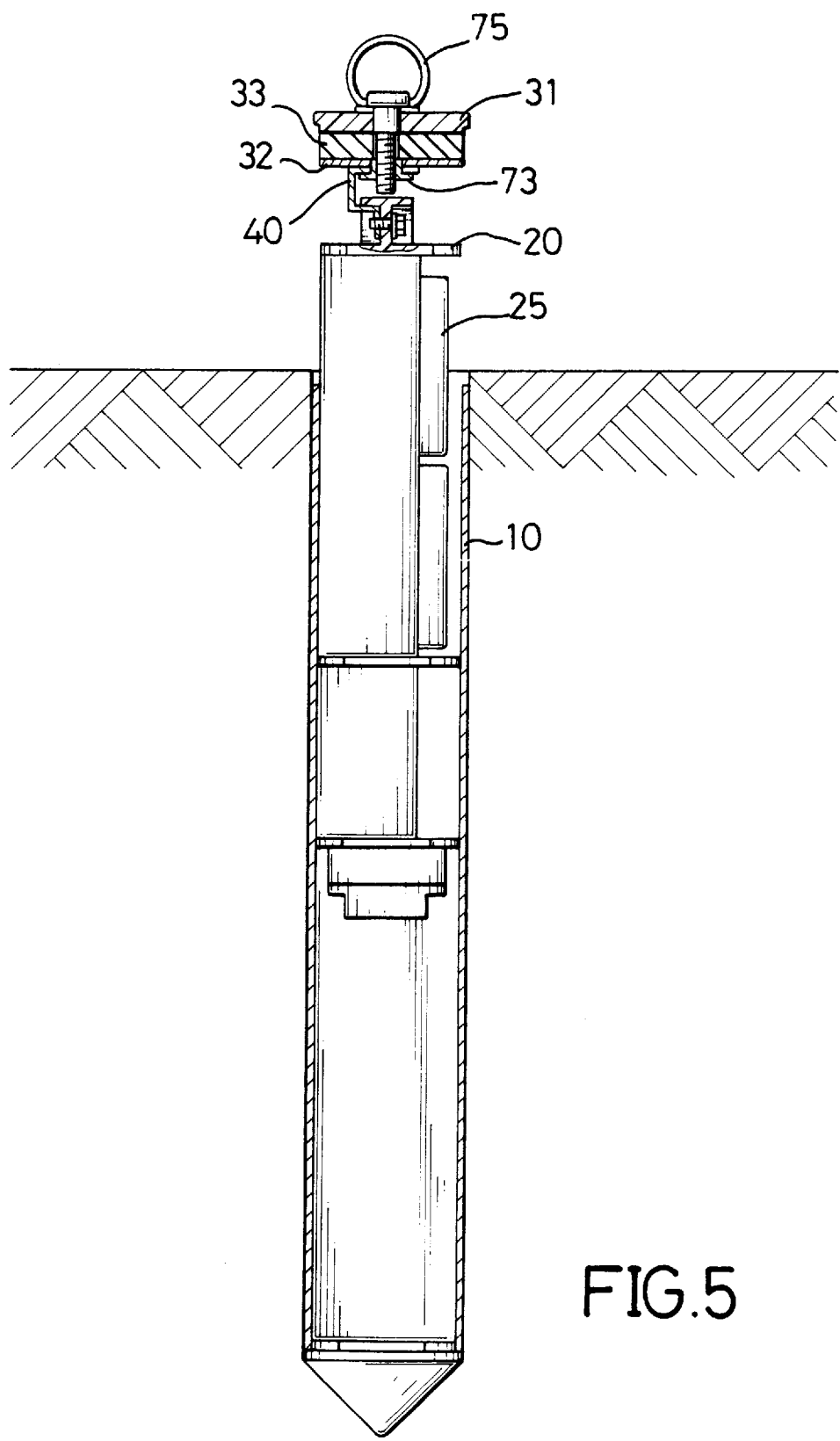
FIG. 5 is a schematic view showing a displacement of the frame and the covering device.

Referring back to FIGS. 1, 2 and taking FIGS. 4 and 5 for reference, a handle 75 is pivotally connected to the screw 70, so that when the handle 75 is not in use, it lies substantially in parallel with a top surface of the upper plate 31. When the electricity of batteries 25 is used up and a replacement of the batteries is required, a user just slackens the screw 70 to release the contact of the middle plate 33 with the inner periphery of the tube 10 and pulls the handle 75 upward, whereby the frame 20 together with the batteries 25 will be lifted, which efficiently and effectively solves the problem, as already mentioned, of conventional repellers.

Figure 6:
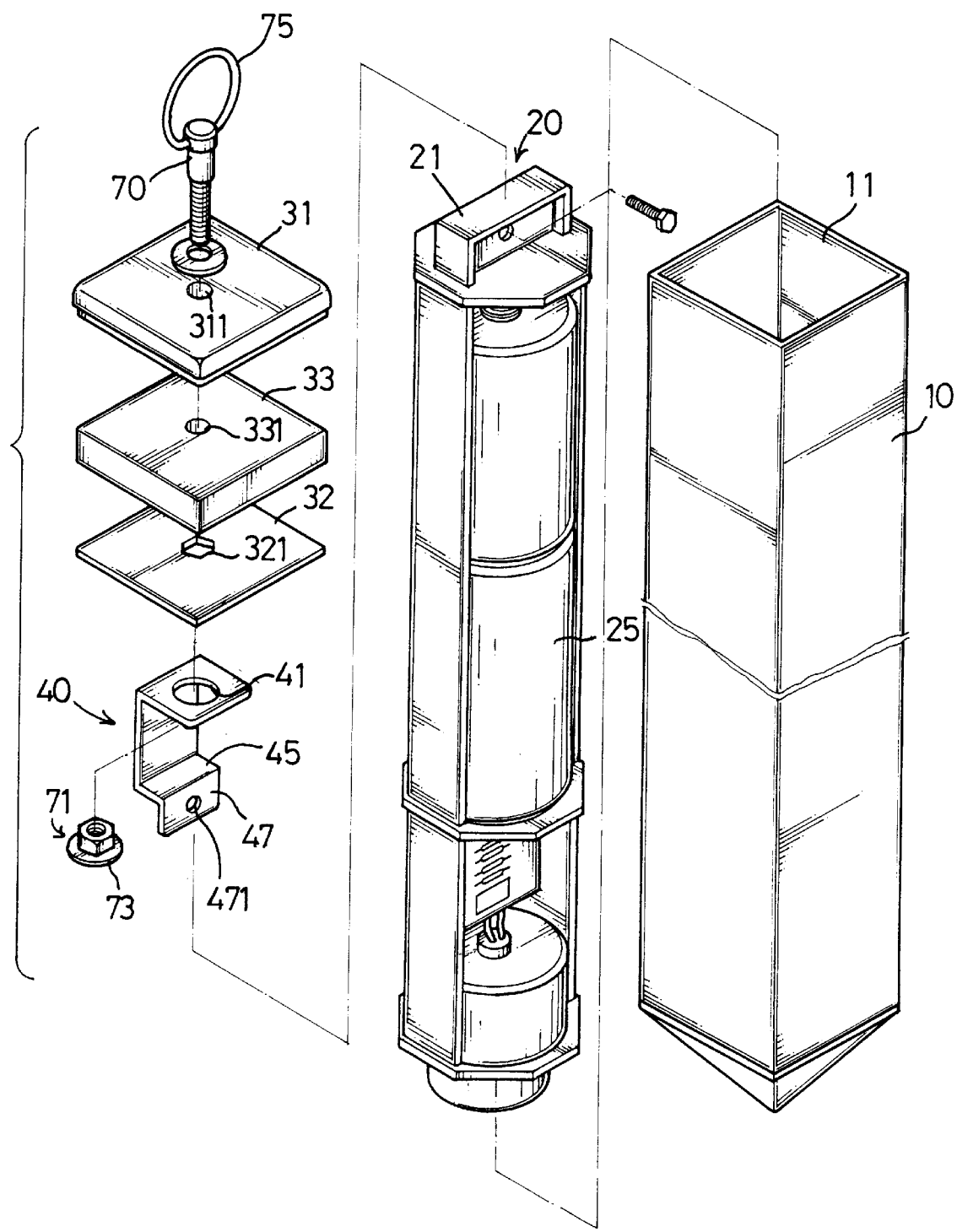
FIG. 6 is a perspective exploded view of another preferred embodiment.
Figure 7:
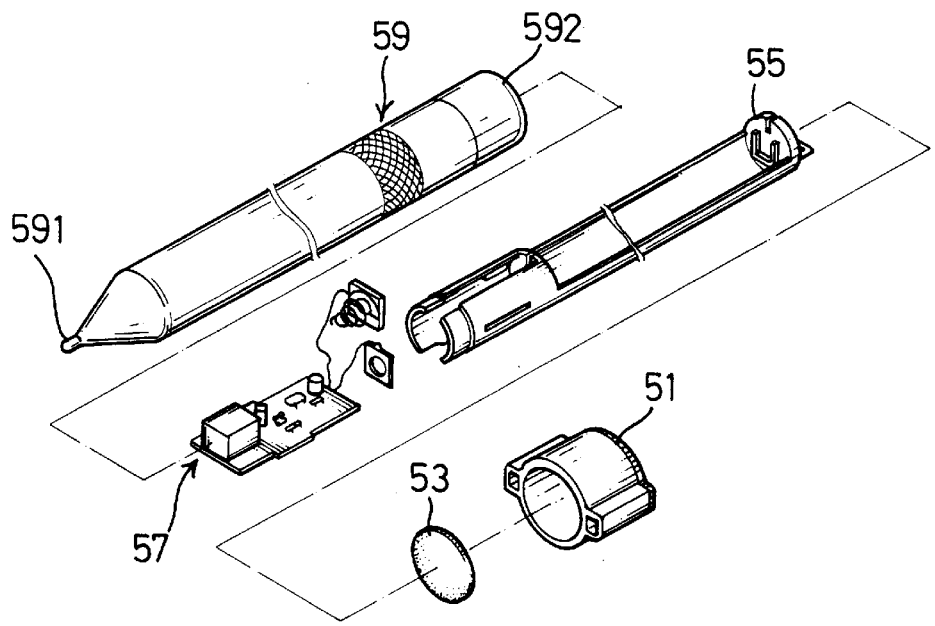
FIG. 7 is an exploded view of a conventional repeller.
Figure 8:
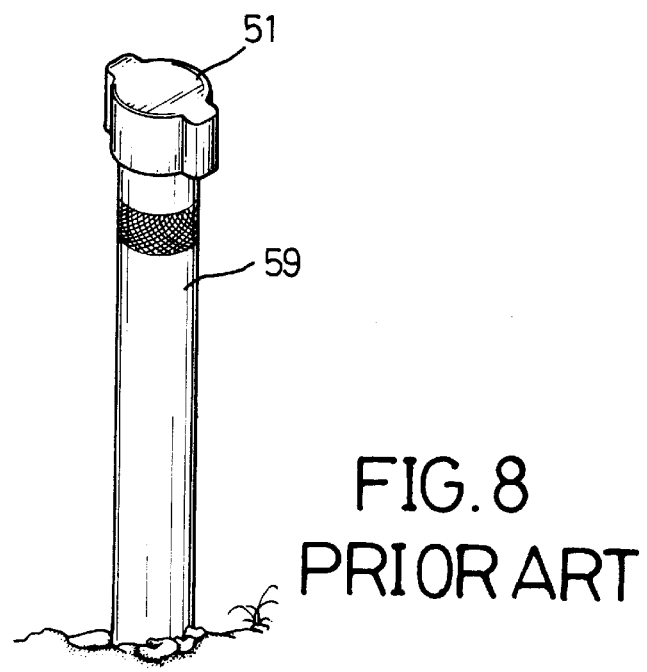
FIGS. 8 is a schematic view showing the conventional repeller pushed into the soil.

FIG. 6 shows another embodiment of the invention, wherein only a vibrator 27 is mounted to the second end of the frame 20 to generate vibration to affect the surrounding soil, which will accomplish the same purpose of scaring off the moles. Other elements of the repeller are the same as described through FIG. 1 to FIG. 5. Therefore, additional description to the related elements are not necessary.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A repeller comprising a tube having an open end and a closed end, a frame slidably received within the tube and having a plurality of batteries in series and securely received therein and a buzzing/vibrating device electrically connected with the batteries and a covering device securely connected to said open end of said tube, wherein the improvements are:

the covering device further comprises:
an upper plate having a centrally defined first hole therein;
a lower plate having a centrally defined second hole corresponding to said first hole of said upper plate;
a middle plate made of resilient, expandable and water proof material being securely disposed therebetween and having a centrally defined third hole corresponding to said first hole of said upper plate;
means for securing said upper plate, said middle plate and said lower plate together through respective centrally defined holes of said upper plate, said middle plate and said lower plate; said middle plate being compressed to expand outwardly to seal said tube.

2. The repeller as claimed in claim 1 further comprises a connector securely connected between said covering device and said frame.

3. A repeller comprising:
a tube having an open end and a closed end;
a frame slidably received within the tube and having a plurality of batteries securely received in series therein;
a buzzing/vibrating device electrically connected with said batteries;
a covering device securely, connected to said open end of said tube and having an upper plate having a centrally defined first hole, a lower plate having a centrally defined second hole corresponding to said first hole of said upper plate and a middle plate having a centrally defined third hole corresponding to said first hole of said upper plate;
a securing device having a screw inserted through said first hole, said third hole and said second hole in sequence, a nut threadingly connected with said screw below said lower plate and having a flange having a diameter slightly larger than a diameter of said second hole of said lower plate and a handle pivotally connected with a top end of said screw; and
a connector securely connected to said covering device via said screw and said nut and mounted to said frame and having a hole defined in a surface thereof and aligning with said second hole of said lower plate, a shoulder formed in parallel with said surface and an extension vertically extended downward from said shoulder;
whereby said second hole of said lower plate being configured to receive said nut, said flange having a diameter slightly larger than a diameter of said hole of said connector, said middle plate made of resilient, expandable and waterproof material being securely disposed between said upper plate and said lower plate.

* * * * *